United States Patent
Ishii et al.

(10) Patent No.: US 9,267,193 B2
(45) Date of Patent: Feb. 23, 2016

(54) HIGH-STRENGTH STEEL SHEET AND THE METHOD FOR PRODUCTION THEREFOR

(75) Inventors: Masashi Ishii, Wako (JP); Sven Leonhardt, Offenbach/am Main (DE); Yoshitaka Okitsu, Wako (JP); Klaus Brokmeier, Duisburg (DE); Georg Frommeyer, Erkrath (DE); Ursula Frommeyer, legal representative, Erkrath (DE); Astrid Frommeyer, legal representative, Basel (CH)

(73) Assignee: HONDA MOTOR CO., LTD, Tokyo (JP)

( * ) Notice: Subject to any disclaimer, the term of this patent is extended or adjusted under 35 U.S.C. 154(b) by 1163 days.

(21) Appl. No.: 13/123,649

(22) PCT Filed: Nov. 5, 2008

(86) PCT No.: PCT/JP2008/003188
§ 371 (c)(1),
(2), (4) Date: Oct. 19, 2011

(87) PCT Pub. No.: WO2010/052751
PCT Pub. Date: May 14, 2010

(65) Prior Publication Data
US 2012/0070330 A1    Mar. 22, 2012

(51) Int. Cl.
*C22C 38/58* (2006.01)
*C22C 38/02* (2006.01)
(Continued)

(52) U.S. Cl.
CPC ............... *C22C 38/02* (2013.01); *B62D 25/04* (2013.01); *B62D 29/007* (2013.01);
(Continued)

(58) Field of Classification Search
CPC ...... C22C 38/00; C22C 38/001; C22C 38/02; C22C 38/04; C22C 38/06; C22C 38/08; C22C 38/12; C22C 38/16; C22C 38/18; C22C 38/20; C22C 38/22; C22C 38/34; C22C 38/38; C22C 38/40; C22C 38/42; C22C 38/44; C22C 38/50; C22C 38/58; B62D 25/04; B62D 29/007; C21D 2211/001
See application file for complete search history.

(56) References Cited

U.S. PATENT DOCUMENTS 2,113,537 A * 4/1938 Hiemenz ................. 148/111
4,494,988 A   1/1985 Schumacher et al.
(Continued)

FOREIGN PATENT DOCUMENTS

DE    19900199 A1    7/2000
JP    51-018917 A    2/1976
(Continued)

OTHER PUBLICATIONS

Buschow, K.H. Jürgen Cahn, Robert W. Flemings, Merton C. Ilschner, Bernhard Kramer, Edward J. Mahajan, Subhash. (2001). Encyclopedia of Materials—Science and Technology, vols. 1-11— Metal Working: Cold Rolling. Elsevier. Online version available at: http://app.knovel.com/hotlink/pdf/id:kt00B7AAU1/encyclopedia-materials/metal-working-cold-roll.*

(Continued)

*Primary Examiner* — Roy King
*Assistant Examiner* — Jophy S Koshy
(74) *Attorney, Agent, or Firm* — Westerman, Hattori, Daniels & Adrian, LLP

(57) ABSTRACT

A high-strength steel sheet comprises, by weight, not less than 0.25% and not more than 0.5% of C, not less than 4% and not more than 14% of Mn, not less than 6.5% and not more than 9.5% of Cr, and not less than 0.3% and not more than 3% of Si. The high-strength steel sheet satisfies formulas 1 and 2, formula (1) being $12 \leq 2.0Si+5.5Al+Cr+1.5Mo \leq 25$ and formula (2) being $13 \leq 30C+0.5Mn+0.3Cu+Ni+25N \leq 17$, and mainly consists of austenite, and the high-strength steel sheet has yield strength of not less than 1000 MPa and total elongation of not less than 20%. In formulas 1 and 2, each element in the above formulas indicates the content, in weight %, of the element.

8 Claims, 3 Drawing Sheets

(51) Int. Cl.
  *B62D 25/04* (2006.01)
  *B62D 29/00* (2006.01)
  *C22C 38/00* (2006.01)
  *C22C 38/04* (2006.01)
  *C22C 38/06* (2006.01)
  *C22C 38/38* (2006.01)
  *C22C 38/42* (2006.01)
  *C22C 38/44* (2006.01)
  *C22C 38/50* (2006.01)

(52) U.S. Cl.
  CPC .............. *C22C 38/001* (2013.01); *C22C 38/04* (2013.01); *C22C 38/06* (2013.01); *C22C 38/38* (2013.01); *C22C 38/42* (2013.01); *C22C 38/44* (2013.01); *C22C 38/50* (2013.01); *C22C 38/58* (2013.01); *C21D 2211/001* (2013.01)

(56) References Cited

U.S. PATENT DOCUMENTS

| 6,358,338 | B1 * | 3/2002 | Guelton et al. ............... 148/547 |
| 2008/0199345 | A1 | 8/2008 | Scheller et al. | |

FOREIGN PATENT DOCUMENTS

| JP | 58185722 | A | * | 10/1983 | .............. C22C 38/38 |
|---|---|---|---|---|---|
| JP | 6-081033 | A | | 3/1994 | |
| JP | 2002-504175 | A | | 2/2002 | |
| JP | 2002-507251 | A | | 3/2002 | |
| JP | 2004-162120 | A | | 6/2004 | |
| JP | 2006-509912 | A | | 3/2006 | |
| JP | 2007-146233 | A | | 6/2007 | |
| JP | 2008-280609 | A | | 11/2008 | |
| WO | 99/01585 | A1 | | 1/1999 | |
| WO | 03/029504 | A2 | | 4/2003 | |
| WO | 2006/125412 | A1 | | 11/2006 | |

OTHER PUBLICATIONS

International Search Report of PCT/JP2008/003188, mailing date Apr. 14, 2009.

Supplementary European Search Report dated May 3, 2012, issued in corresponding European Patent Application No. 08877947.5, (3 pages).

* cited by examiner

HIGH-STRENGTH STEEL SHEET AND THE METHOD FOR PRODUCTION THEREFOR

TECHNICAL FIELD

The present invention relates to high-strength steel sheets having high strength and high press formability, such that yield point is not less than 1000 MPa and total elongation is not less than 20%, and relates to a production method therefor.

BACKGROUND ART

Recently, safety in collisions has become an important issue regarding automobiles, and technology has been developed for the body of the automobile so as to ensure that a space for occupants will remain to ensure the survival and protection of the occupants in the impacts in automobile collisions. In actual collisions of automobiles, collisions may occur from the front, the sides, the rear, etc. Specifically, the collisions from the sides are important from the standpoint of the protection of the occupants. This is because a structural part of an automobile body, in this case, a center pillar is close to the car occupants.

Accordingly, a steel sheet in which strength, specifically, yield point thereof, is increased is used for structural parts of an automobile body, such as a center pillar, which may be important when a side collision occurs. The yield point of a material is an important characteristics of parts that may deform in side collisions because the parts should be prevented from deforming as much as possible when a collision occurs.

In general, when a steel sheet is strengthened, ductility thereof is decreased, and press formability is thereby decreased. Accordingly, the cross sectional shape of a part should be simple, and a steel sheet having relatively low strength should be used instead of the above steel sheet having very low press formability.

Currently, various steel sheets prescribed in JFSA2001 "Cold rolled steel sheets and strip for automobile use", standardized by The Japan Iron and Steel Federation, are widely used for automobile bodies. Specifically, steel sheets having a grade of tensile strength of 590 MPa or 780 MPa are widely used for parts, such as a center pillar, which may receive the impact in side collisions. Therefore, if a steel sheet having higher strength can be used, the deformation of the automobile body that may occur in a collision is reduced. In addition, the steel sheet can be reduced in weight by decreasing sheet thickness thereof. However, this method is not easily performed. A steel sheet having a grade of tensile strength of 780 MPa as described above, that is, a steel sheet having a sheet thickness of 1 mm and prescribed by JSC780Y in JFSA2001, the total elongation is 14 to 27%, and the average value of the total elongation is approximately 21%. Therefore, if a steel sheet does not have an elongation of approximately 20% or more, the steel sheet cannot be substituted for a part that is made of a material prescribed by JSC780Y in the present circumstances.

A steel prescribed by JSC1180Y is a type of a steel having the highest strength of steel prescribed by JFSA2001. In a case of the steel prescribed by JSC1180Y and having a sheet thickness of 1 mm, the yield point is 825 to 1215 MPa but the total elongation is only 6 to 17%. In practice, the inventors performed tensile tests by using a test specimen of type of No. 5 that was prescribed by JIS Z 2201 and was made of a steel with grade of JSC1180Y, and the total elongation was approximately 8%. The steel having total elongation of such a degree cannot be used as a substitute steel sheet for a steel with grade of JSC780Y.

In the present techniques for steel sheet for automobiles, a steel having both high strength and high ductility is not easily produced because metal structure is strengthened by quenching so as to improve the strength of a steel. Since it is difficult to improve the yield point to be not less than 1000 MPa when a steel has a ferrite, a steel sheet may be quenched so as to have a structure mainly consisting of martensite. In this case, elongation of the steel sheet is deteriorated because the martensite has high strength but has low ductility.

A steel sheet having both high strength and high formability has been required, but such a steel may not be formed as long as a steel is mainly consisting of ferrite as described above. A typical austenite stainless steel consisting of austenite has relatively high strength and has a superior elongation compared to a steel consisting of ferrite. In this case, austenite stainless steel requires a large quantity of Ni and Cr, and alloy cost is thereby increased. Recently, a technique for providing both high strength and high ductility to a steel has been the subject of research. In this technique, in order to reduce the alloy cost, a steel having austenite is formed by reducing Ni and adding a large amount of Mn instead.

For example, Japanese Unexamined Patent Application Publication (Translation of PCT Application) No. 2002-507251 (WO99/001585) discloses a steel sheet having characteristics of TWIP (twining-induced plasticity) and TRIP (transformation-induced plasticity). This steel sheet is made of austenite steel including approximately 25% of Mn by weight and not more than 12% of the total of Si and Al by weight. This steel sheet has a yield point of not less than 400 MPa, a tensile strength of 1100 MPa, a uniform elongation of 70%, and a maximum elongation of 90%. Japanese Unexamined Patent Application Publication (Translation of PCT Application) No. 2005-504175 (WO03/029504) discloses a duplex steel or a triplex steel including 0.5 to 2% of C by weight, 18 to 35% of Mn by weight, and more than 12% of the total of Al and Si. Japanese Unexamined Patent Application Publication (Translation of PCT Application) No. 2006-509912 discloses a production method for a steel, in which a steel including 7 to 30% of Mn and 3.5 to 12% of the total of Al and Si is used, and yield strength of the steel is improved by forming at 2 to 25% at room temperature.

Every raw material of a steel sheet described in the above conventional techniques has austenite that is produced by adding a large amount of Mn thereto, and ductility is thereby improved. However, the above techniques have the following problems.

The steel sheet disclosed in the Japanese Unexamined Patent Application Publication (Translation of PCT Application) No. 2002-507251 (WO99/001585) has high elongation and has a yield point of not less than 400 MPa. Although parts for receiving an impact of side collisions, such as a center pillar as described above, require a high yield point, the yield point of this steel sheet is insufficient. This steel sheet has a tensile strength of 1100 MPa, but this degree of tensile strength is insufficient because a much higher tensile strength is required so as to ensure a space for occupants in an automobile body.

In the Japanese Unexamined Patent Application Publication (Translation of PCT Application) No. 2005-504175 (WO03/029504), a steel does not have a metal structure of a single phase of austenite, but has a mixed structure of ferrite and austenite, or a mixed structure of ferrite, austenite, and martensite. This steel sheet has a characteristic in which flow stress is more than 400 MPa, and a cold strip of the steel has strength of 900 MPa and maximum elongation of 70%. The strength of this steel sheet is insufficient for the required strength, which is the same as the case of the Japanese Unexamined Patent Application Publication (Translation of PCT Application) No. 2002-507251 (WO99/001585).

The technique disclosed in the Japanese Unexamined Patent Application Publication (Translation of PCT Application) No. 2006-509912 is a production method for improving yield strength and tensile strength by forming an austenite steel sheet including a large amount of Mn at room temperature. As a practical example, Table 1 in the Japanese Unexamined Patent Application Publication (Translation of PCT Application) No. 2006-509912 shows material characteristics of a steel that includes 25.9% of Mn and was cold rolled at different rolling reductions. When the rolling reduction was 50%, flow stress at 0.2% was increased to 1051 MPa, but elongation was substantially decreased to approximately 5%, and this steel is therefore inappropriate for press forming. In the Japanese Unexamined Patent Application Publication (Translation of PCT Application) No. 2006-509912, the rolling reduction should be decreased so as to ensure the elongation of not less than 20%, and the flow stress at 0.2% is thereby less than 1000 MPa.

DISCLOSURE OF THE INVENTION

As described above, a steel sheet having a yield point of not less than 1000 MPa and total elongation of not less than 20% may not be obtained in spite of an austenite steel sheet. The present invention has been completed in view of the above circumstances, and an object of the present invention is to provide a high-strength steel sheet and a production method therefor. By appropriately adjusting components and production conditions, the high-strength steel sheet is provided with elongation sufficient for facilitating press forming and is provided with high yield point and high tensile strength for ensuring a collision performance.

The inventors have performed research on high-strength steel sheets in which elongation is ensured and yield point is improved. As a result, although the metal structure is austenite, the occurrence of stress-induced martensitic transformation is controlled by appropriately adjusting a range of alloy compositions that are defined by Ni equivalent and Cr equivalent. That is, by performing a rolling at a rolling reduction of a predetermined range in a temperature range in which the strain-induced martensitic transformation does not occur, the austenite is maintained while the yield point is improved. Accordingly, when press forming is performed at room temperature, the strain-induced martensitic transformation is extreme, and a steel is thereby strongly hardened by cold working. When the strain-induced martensitic transformation occurs during press forming, high work hardening is applied by TRIP (transformation-induced plasticity). In a high-strength steel sheet of the present invention, the yield strength is improved by prior working such as a cold rolling, and the tensile strength is on a very high level by severe work hardening in press forming, which is different from the technique disclosed in the Japanese Unexamined Patent Application Publication (Translation of PCT Application) No. 2006-509912. Therefore, localized plastic necking does not easily occur, and both high strength and high press formability are thereby provided to a steel. A steel will exhibit both high strength and high ductility in a tensile test due to the same phenomenon. According to the above research conducted by the inventors, it was found that a high-strength steel sheet having a high yield point, high tensile strength, and high ductility can be obtained.

A high-strength steel sheet of the present invention was completed based on the above findings. The present invention provides a high-strength steel sheet comprising, by weight, not less than 0.25% and not more than 0.5% of C, not less than 4% and not more than 14% of Mn, not less than 6.5% and not more than 9.5% of Cr, and not less than 0.3% and not more than 3% of Si. The high strength steel of the present invention satisfies the following formulas 1 and 2 and consists of austenite, and yield strength is not less than 1000 MPa and total elongation is not less than 20%.

$$12 \leq 2.0Si + 5.5Al + Cr + 1.5Mo \leq 25 \quad (1)$$

$$13 \leq 30C + 0.5Mn + 0.3Cu + Ni + 25N \leq 17 \quad (2)$$

(Each element symbol in the above formulas indicates the content (weight %) of the element)

The above high-strength steel sheet preferably comprises not less than 0.005% and not more than 0.05% of N and not less than 0.05% and not more than 4% of Al. Moreover, the above high-strength steel sheet preferably comprises not less than 0.1% and not more than 4% of Ni and not less than 0.05% and not more than 3% of Mo. In addition, the high-strength steel sheet preferably comprises not less than 0.1% and not more than 2% of Cu.

The inventors have performed intensive research on production conditions so as to provide high yield point, high tensile strength, and high elongation to a steel comprising the above alloy compositions. As a result, the inventors found that yield point can be further improved without decreasing elongation greatly by hot rolling a steel sheet, heating the hot rolled steel sheet to a warm temperature, and rolling the steel sheet at a predetermined range of rolling reduction.

That is, in a preferable high-strength steel sheet of the present invention, the total content rate of martensite in a metal structure is not more than 10%, and an aspect ratio of crystal grain sizes measured in a cross section that is parallel to the rolling direction is not less than 2. Moreover, in a preferable example of the high-strength steel sheet, the steel sheet has an increasing rate of the total content rate of martensite with respect to tensile strain of 1% when the steel is deformed in tension, and the increasing rate is not less than 0.6%.

The present invention provides a method for producing the above high-strength steel sheet, in which a slab consisting of a predetermined composition is hot rolled and then is rolled so that total rolling reduction R (%) and rolling temperature T (° C.) satisfy the following formulas (3) and (4).

$$20\% \leq R \leq 70\% \quad (3)$$

$$60° C. \leq T \leq 500° C. \quad (4)$$

Effect of the Invention

According to the present invention, a steel sheet having a superior balance of strength and ductility, which cannot be provided in a conventional austenite steel sheet including a large amount of Mn, can be obtained. The steel sheet is provided with a yield point of not less than 1000 MPa, tensile strength of not less than 1200 MPa, and total elongation of not less than 20%.

BEST MODE FOR CARRYING OUT THE INVENTION

Figure 1:
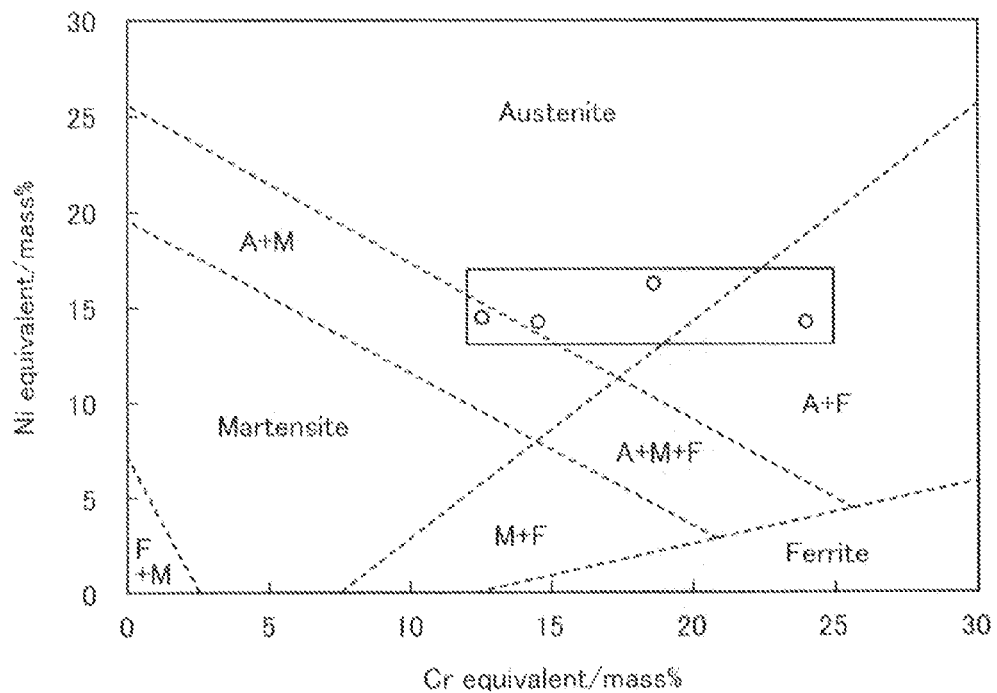
FIG. 1 is a Schaeffler diagram showing a relationship of Cr equivalent, Ni equivalent, and metal structure.

Alloy compositions of the present invention will be described. The metal structure of a high-strength steel sheet of the present invention substantially consists of a single phase of austenite, and the austenite is easily transformed into martensite by deformation of a material. Therefore, high work hardening is applied, and tensile strength is thereby high. If the austenite is unstable, the austenite is easily transformed into a martensite or a mixed structure of martensite and austenite during a production process, whereby the austenite that is required cannot be obtained. On the other hand, if the austenite is very stable, high work hardening is not applied by TRIP (transformation-induced plasticity) in press forming, whereby high strength cannot be provided to a steel. Therefore, stability of austenite should be adjusted to be in an appropriate range, and alloy compositions should be adjusted to be in an appropriate range so as to obtain the austenite that is required.

In the present invention, austenite with an appropriate stability can be obtained by adjusting the Cr equivalent and the Ni equivalent, which are described by the following, to be in an appropriate range.

Cr equivalent: 2.0Si+5.5Al+Cr+1.5Mo
Ni equivalent: 30C+0.5Mn+0.3Cu+Ni+25N

Specifically, a steel sheet comprising austenite in which stability is adjusted to be in an appropriate range can be obtained by adjusting alloy compositions to satisfy the following formulas (1) and (2).

$$12 \leq 2.0Si+5.5Al+Cr+1.5Mo \leq 25 \quad (1)$$

$$13 \leq 30C+0.5Mn+0.3Cu+Ni+25N \leq 17 \quad (2)$$

(Each element symbol in the above formulas indicates the content (weight %) of the element)

FIG. 1 is a Schaeffler diagram that is a phase diagram showing a relationship of Cr equivalent, Ni equivalent, and metal structures. The present invention is shown in the rectangle area of the figure. According to FIG. 1, a metal structure of the present invention is defined by an area that covers a single phase region of austenite and a region of austenite and martensite. As shown in FIG. 1, when the value of the formula (1) is less than 12, elongation is decreased because martensite that has low deformability is increased. When the value of the formula (1) is more than 25, austenite that is required can be obtained, but high work hardening may not be applied because the austenite is very stable, and high strength steel cannot be obtained. Similarly, when the value of the formula (2) is less than 13, elongation is decreased because the ratio of the martensite is increased. When the value of the formula (2) is more than 17, high work hardening may not be applied because the austenite is very stable, whereby high strength steel cannot be obtained.

Moreover, the alloy composition is adjusted to be in the rectangular area in order to adjust stacking-fault energy. In the high-strength steel sheet of the present invention, by facilitating occurrence of the strain-induced martensitic transformation of austenite during deforming at room temperature, high work hardening is applied. Therefore, the present invention provides a steel having both a high yield point and a high elongation. For example, the steel sheet disclosed in the Japanese Unexamined Patent Application Publication (Translation of PCT Application) No. 2002-507251 (WO99/001585) has characteristics of TWIP (twinning-induced plasticity) and TRIP (transformation-induced plasticity). In this case, if TWIP (twinning-induced plasticity) occurs, high work hardening cannot be applied whereas ductility is high. The reason for this is that a twin crystal is one of stacking-faults of a face-centered cubic lattice (fcc) and does not affect the work hardening property because introduced dislocations do not interact, in contrast to an ordinary slip deformation.

In the high-strength steel sheet of the present invention, the balance of Cr equivalent and Ni equivalent is defined, whereby the effect of TWIP (twinning-induced plasticity) is reduced as much as possible, and the effect of TRIP (transformation-induced plasticity) is increased while austenite is formed. Therefore, high work hardening is applied, whereby material strength is increased, and elongation can be sufficiently ensured.

Stacking-fault energy is an important factor that affects the above deformation property of a steel. As shown on page 535 in Metal Handbook compiled by the Japan Institute of Metals, $\epsilon$-martensite is more easily produced as the stacking-fault energy of austenite is small. $\epsilon$-martensite has a structure of hexagonal close packed lattice (hcp) and is one of stacking-faults of a face-centered cubic lattice, which is the same as the case of the twin crystal, whereby high work hardening may not be applied to a steel. That is, since the stacking-fault energy is low, the energy may not be greatly required for producing stacking-faults. According to the low energy, $\epsilon$-martensite and twin crystals are easily produced. In the steel sheet having characteristics of TWIP (twinning-induced plasticity) and TRIP (transformation-induced plasticity), which is disclosed in the Japanese Unexamined Patent Application Publication (Translation of PCT Application) No. 2002-507251 (WO99/001585), the stacking-fault energy is approximately 24 mJ/m$^2$ or slightly less.

In contrast, in the high-strength steel sheet of the present invention, the content of Mn, which may further decrease the stacking-fault energy, is less than that in the steel sheet disclosed in the Japanese Unexamined Patent Application Publication (Translation of PCT Application) No. 2002-507251 (WO99/001585), whereby the stacking-fault energy is higher than approximately 35 mJ/m$^2$. Therefore, a twinning deformation and a transformation into $\epsilon$-martensite are reduced, and a transformation into $\alpha'$-martensite is extremely increased. $\alpha'$-martensite has the same structure as the hardened structure of a ferrite steel and has a body-centered tetragonal lattice (bct) that is entirely different from the crystal structure of austenite. $\alpha'$-martensite has characteristics in which volume may be expanded according to the transformation, and hardness is very high.

In addition to the above formulas (1) and (2), there are a preferable upper limit and a lower limit for each alloy element. The reason for the limit will be described in detail hereinafter. It should be noted that "%" indicates "% by weight" in the following description.

C: 0.2 to 0.5%

C is an austenite-forming element and is inexpensive, whereby C may be added as necessary. When the added amount of C is less than 0.25%, the stability of austenite is insufficient. On the other hand, when the added amount of C is more than 0.5%, austenite is stabilized, but deformation-induced martensitic transformation is not sufficiently performed, whereby sufficient work hardening cannot be applied. Therefore, it is preferable that the added amount of C be not less than 0.25% and not more than 0.5%.

Cr: 6.5 to 9.5%

Cr is required for adjusting the above Cr equivalent and forming an appropriate metal structure. When the added amount of Cr is less than 6.5%, metastable austenite is not produced. On the other hand, when the added amount of Cr is more than 9.5%, ferrite is stabilized. Therefore, it is preferable that the added amount of Cr be not less than 6.5% and not more than 9.5%.

N: 0.005 to 0.05%

N is an element that may form a metastable austenite, which has the same effect as that of C, and is added as necessary. When the added amount of N is less than 0.005%, the above effect is insufficient. On the other hand, when the added amount of N is more than 0.05%, nitrides are precipitated, depending upon the alloy composition whereby the above effect cannot be further obtained, and ductility of a steel is decreased. Therefore, the added amount of N is preferably set to be not less than 0.005% and not more than 0.05%.

Mn: 4 to 14%

Mn is an austenite-stabilizing element and is thereby added so as to produce necessary amounts of metastable austenite. When the added amount of Mn is less than 4%, the above effect is insufficient because the added amount of Mn does not much differ from that of an ordinary steel. On the other hand, when the added amount of Mn is more than 14%, austenite is stabilized, whereby the effect of strain-induced transformation (TRIP) cannot be obtained. Therefore, the added amount of Mn is preferably set to be not less than 4% and not more than 14%.

Ni: 0.1 to 4%

Ni is an element for producing metastable austenite, which has the same effect as that of Mn, but is not added because the cost is high. Since Ni improves ductility of a steel more than Mn does, Ni may be added instead of Mn when high ductility is required for a steel. When the added amount of Ni is less than 0.1%, the above effect is insufficient. On the other hand, when the added amount of Ni is more than 4%, the added amount of Ni does not much differ from that of austenite stainless steel, and the cost of steel is extremely increased. Therefore, the added amount of Ni is preferably set to be not less than 0.1% and not more than 4%.

Si: 0.3 to 3%

The above Cr equivalent can be adjusted by adding appropriate amount of Si, and Si has an effect of solid solution hardening Since a steel is strengthened when Si coexists with Mo and is transformed into precipitations ($Mo_3Si$ or $MoSi_2$), Si is added to a steel according to the strength that is required. When the added amount of Si is less than 0.3%, which is the same level as that of an ordinary steel, the above effects are insufficient. On the other hand, when the added amount of Si is more than 3%, weldability is decreased. Therefore, the added amount of Si is preferably set to be not less than 0.3% and not more than 3%.

Al: 0.05 to 4%

Al is an element for forming metastable austenite and may be added instead of Cr. When the added amount of Al is less than 0.05%, which is the same level as that of an ordinary killed steel, the above effect is insufficient. On the other hand, when the added amount of Al is more than 4%, austenite may be unstabilized, and ferrite is formed. Therefore, the added amount of Al is preferably set to be not less than 0.05% and not more than 4%.

Mo: 0.05 to 3%

Mo may be combined with Si that is included in a steel and be transformed into precipitations such as $Mo_3Si$ and $MoSi_2$, thereby improving the strength of a steel. Therefore, Mo is added to a steel as necessary. When the added amount of Mo is less than 0.05%, which is the same level as that of an ordinary steel, the above effect is insufficient. On the other hand, when the added amount of Mo is more than 3%, the production cost of steel is greatly increased. Therefore, the added amount of Mo is preferably set to be not less than 0.05% and not more than 0.3%.

Cu: 0.1 to 2%

Cu is an austenite-stabilizing element and may be added as necessary so as to adjust the Ni equivalent. When the added amount of Cu is less than 0.1%, which is the same level as that of an ordinary steel, the above effect is insufficient. On the other hand, when the added amount of Cu is more than 2%, austenite is strongly stabilized, and the production cost of the steel is greatly increased. Therefore, the added amount of Cu is preferably set to be not less than 0.1% and not more than 2%.

Next, the metal structure of a high-strength steel sheet of the present invention will be described. By adjusting the alloy compositions as described above, substantial austenite can be formed in a high-strength steel sheet, and high elongation is provided to the high-strength steel sheet because strain-induced martensitic transformation occurs in deforming Moreover, a high yield point can be provided to the high-strength steel sheet by rolling the raw material and adding work strain. In general, in order to efficiently improve yield point of a steel, a raw material may be worked by a method such as a rolling. In this case, when a steel sheet, such as a high-strength steel sheet of the present invention, in which strain-induced martensitic transformation of austenite easily occurs, is worked at room temperature, the ductility is greatly reduced. For example, as described in the Japanese Unexamined Patent Application Publication (Translation of PCT Application) No. 2006-509912, if a cold working is performed so as to improve the yield point of austenite steel including a large amount of Mn, the ductility is suddenly reduced when the working rate exceeds 30%. Therefore, there is a limit to the working rate, and a yield point cannot be obtained at a high degree.

This is because austenite is easily transformed into martensite when strain is applied by cold rolling. Therefore, a sufficient amount of austenite does not remain in the steel sheet after cold rolling, whereby high work hardening due to TRIP (transformation-induced plasticity) cannot be applied.

Accordingly, in the present invention, rolling is performed in a temperature range in which martensitic transformation and recrystallization do not occur, in order to apply strain to a raw material. As a result, the yield point of the raw material can be improved by applying strain, whereas most of the austenite remains in the structure.

The above rolling can be controlled by an aspect ratio of crystal grain sizes and content of martensite. That is, in a high-strength steel sheet of the present invention, the aspect ratio of crystal grain sizes in a metal structure is set to be not less than 2, and the content of martensite is set to be not more than 10%.

A method for measuring an aspect ratio will now be described in detail. A steel sheet is cut and is buried in a resin so as to observe a cross section parallel to the rolling direction, and the metal structure of the steel sheet is exposed by an etching fluid such as nitric ethanol, picric acid, and Marble's reagent. Then, the metal structure is observed by an optical microscope or SEM, and a photograph of the structure is obtained at approximately a magnification of 200 to 2000. In the photograph, crystal grains are cut by a line that is drawn at an optional position perpendicular to the rolling direction, and a mean value dT of the lengths of sections of the crystal grains is obtained. Similarly, crystal grains are cut by a line that is drawn at an optional position parallel to the rolling direction, and a mean value dL of the lengths of sections of the crystal grains is obtained. Then, an aspect ratio is defined by dL/dT. High aspect ratio indicates that structure transformation due to recrystallization did not occur in rolling, and that the crystal grains were elongated, that is, work strain was applied by rolling.

After the above rolling, most of austenite should remain without transforming, or a high work hardening effect of the present invention cannot be obtained. Specifically, high work hardening can be applied when a steel sheet is deformed in a condition in which the content of martensite is not more than 12% after rolling.

Furthermore, in order to control the work hardening in deforming of a high-strength steel sheet, which is an important factor for a high-strength steel sheet of the present invention, an increasing rate of content of martensite in a high-strength steel sheet may be controlled. Specifically, when a high-strength steel sheet is deformed by tensile strength, the increasing rate of content of martensite with respect to strain of 1% is set to be not less than 0.6%.

The content of martensite may be measured by using a method, for example, in which a magnetic permeability of a steel sheet is measured and the content of martensite is estimated. This method is generally known, and in the preferred example of the present invention, the amount of martensite was measured by using a ferrite scope (TM) manufactured by Helmut Fischer Gmbh+Co. in Germany. In this method, the total amount of the contents of martensite and ferrite is obtained, to be exact. However, the measurement result can be regarded as the amount of content of martensite because the steel sheet of the present invention consists of austenite and martensite that is produced by transformation of austenite.

Conditions for producing a steel sheet of the present invention will be described in detail. In the present invention, by adjusting the alloy compositions as described above, Cr equivalent, Ni equivalent, and stacking-fault energy are adjusted to be in appropriate ranges. Therefore, strain-induced a'-martensitic transformation easily occurs, and high work hardening is thereby applied. On the other hand, in a case in which a product is made of a steel sheet as hot rolled, and a case in which a product is made of a steel that is cold rolled and is annealed after hot rolling, the yield point of a steel is low and is insufficient for the requirements. Therefore, in the present invention, strain is added to a steel by rolling so as to provide a high yield point thereto. In this case, as described above, a high-strength steel sheet of the present invention is rolled in a temperature range in which strain-induced martensitic transformation does not occur, and the steel sheet is then formed into a product.

The inventors have researched in detail regarding a condition of a warm rolling in which yield point is effectively increased without strain-induced martensitic transformation occurring. As a result, the inventors found that rolling reduction is preferably set to a range of 20 to 70%, and rolling temperature is preferably set to a range of 60 to 500° C. in a warm rolling. When the rolling reduction is low, yield point is not sufficiently increased. On the other hand, when the rolling reduction is very high, martensitic transformation does not occur, but elongation is extremely deteriorated because the degree of deformation of austenite approaches the limit thereof. When the rolling temperature is very low, strain-induced martensitic transformation easily occurs, whereby ductility of a product may be deteriorated, whereas yield point is increased. When the rolling temperature is very high, strain is greatly recovered in warm rolling, whereby the yield point may not be easily increased.

Examples

Specific examples of the present invention will be described. Each steel consisting of alloy compositions shown in Table 1 was ingoted by vacuum melting and was hot rolled. Then, rolling was performed on the steel under conditions shown in Table 2, and steel sheets of practical examples 1 to 11 and comparative examples 1 to 10 were produced. A specimen for tensile test having a shape of No. 5 prescribed in JIS Z2201 (Japanese Industrial Standard Z2201) was formed from the steel sheet produced so that rolling direction paralleled the tensile direction. Tensile testing was performed by using an Instron-type tensile testing machine. In this case, the alloy compositions of invention slabs 1 to 4 in Table 1 satisfied the formulas (1) and (2), and the alloy compositions of each comparative slab 1 to 6 in Table 1 did not satisfy one of the formulas (1) and (2) or both of them. In Table 2, specimens of the practical examples 1 to 11 satisfied all of the formulas (1) to (4), and each specimen of the comparative examples 1 to 10 did not satisfy some of the formulas (1) to (4).

TABLE 1

| | Compositions | | | | | | | | | | | | Cr equivalent | | | Ni equivalent | | |
| --- | --- | --- | --- | --- | --- | --- | --- | --- | --- | --- | --- | --- | --- | --- | --- | --- | --- | --- |
| | C % | Si % | Mn % | P % | S % | Al % | Ti % | Cu % | Ni % | Cr % | Mo % | N % | Min. 12 | Max. 25 | Results | Min. 13 | Max. 17 | Results |
| Invention slab 1 | 0.30 | 1.9 | 6.8 | 0.010 | 0.005 | 0.005 | 0.01 | 0.01 | 2.0 | 6.5 | 1.5 | 0.005 | 12.6 | | OK | 14.5 | | OK |
| Invention slab 2 | 0.26 | 2.7 | 8.4 | 0.008 | 0.004 | 0.002 | 0.01 | 0.01 | 4.1 | 8.8 | 3.0 | 0.008 | 18.7 | | OK | 16.3 | | OK |
| Invention slab 3 | 0.25 | 2.5 | 8.0 | 0.012 | 0.006 | 0.010 | 0.01 | 1.5 | 2.0 | 6.5 | 2.0 | 0.007 | 14.6 | | OK | 14.1 | | OK |
| Invention slab 4 | 0.30 | 3.0 | 10.0 | 0.009 | 0.004 | 2.1 | 0.01 | 0.01 | 0.01 | 6.5 | 0.01 | 0.01 | 24.1 | | OK | 14.3 | | OK |
| Comparative slab 1 | 0.30 | 2.5 | 10.0 | 0.010 | 0.006 | 0.012 | 0.01 | 0.01 | 0.01 | 5.0 | 0.01 | 0.01 | 10.1 | | NG | 14.3 | | OK |
| Comparative slab 2 | 0.50 | 2.5 | 12.0 | 0.012 | 0.004 | 2.0 | 0.7 | 0.01 | 0.01 | 6.5 | 0.01 | 0.009 | 22.5 | | OK | 21.2 | | NG |
| Comparative slab 3 | 0.50 | 2.5 | 14.0 | 0.011 | 0.004 | 0.004 | 0.4 | 0.01 | 0.01 | 6.5 | 0.01 | 0.012 | 11.5 | | NG | 22.3 | | NG |
| Comparative slab 4 | 0.17 | 1.4 | 2.0 | 0.012 | 0.001 | 0.02 | 0.01 | 0.01 | 0.01 | 0.02 | 0.01 | 0.003 | 2.8 | | NG | 6.2 | | NG |
| Comparative slab 5 | 0.14 | 0.5 | 1.8 | 0.008 | 0.001 | 0.03 | 0.05 | 0.01 | 0.01 | 0.02 | 0.01 | 0.003 | 1.2 | | NG | 5.2 | | NG |
| Comparative slab 6 | 0.30 | 3.0 | 25.0 | — | — | 3.0 | — | — | — | 0.02 | — | — | 22.5 | | OK | 21.5 | | NG |
| Comparative slab 7 | 0.01 | 3.0 | 30.2 | 0.002 | 0.008 | 3.4 | 0.01 | 0.01 | 0.01 | 0.01 | 0.01 | 0.0012 | 24.5 | | OK | 15.5 | | OK |

TABLE 2

| | | Warm rolling conditions | | | | | Material characteristics | | | |
|---|---|---|---|---|---|---|---|---|---|---|
| | Compositions Symbols | Original sheet thickness | Final sheet thickness | Rolling reduction R % | Start temperature of rolling °C. | End temperature of rolling °C. | Metal structure | Yield point MPa | Tensile strength MPa | Uniform elongation % | Total elongation % |
| | Standard | | | 20~40 | start | finish | | | | | |
| Practical example 1 | Invention slab 1 | 2.5 | 1.6 | 36 | 475 | 200 | A | 1080 | 1320 | 70 | 75 |
| Practical example 2 | Invention slab 2 | 1.8 | 1.15 | 36 | 440 | 243 | A | 1166 | 1302 | 24 | 39 |
| Practical example 3 | Invention slab 2 | 1.8 | 1.43 | 21 | 450 | 240 | A | 1087 | 1323 | 37 | 45 |
| Practical example 4 | Invention slab 2 | 1.8 | 0.98 | 46 | 300 | 202 | A | 1217 | 1320 | 26 | 37 |
| Practical example 5 | Invention slab 2 | 1.8 | 1.13 | 37 | 200 | 160 | A | 1258 | 1332 | 24 | 39 |
| Practical example 6 | Invention slab 2 | 1.8 | 0.95 | 47 | 450 | 183 | A | 1273 | 1329 | 26 | 34 |
| Practical example 7 | Invention slab 2 | 1.8 | 0.89 | 51 | 440 | 260 | A | 1269 | 1336 | 26 | 34 |
| Practical example 8 | Invention slab 2 | 1.8 | 0.61 | 66 | 382 | 104 | A | 1513 | 1599 | 25 | 34 |
| Practical example 9 | Invention slab 2 | 1.1 | 0.88 | 20 | 110 | 67 | A | 1066 | 1471 | 20 | 27 |
| Practical example 10 | Invention slab 3 | 2.5 | 1.6 | 36 | 475 | 230 | A | 1180 | 1310 | 25 | 25 |
| Practical example 11 | Invention slab 4 | 2.5 | 1.6 | 36 | 475 | 220 | A | 1090 | 1207 | 22 | 22 |
| Comparative example 1 | Invention slab 2 | 1.1 | 0.61 | 45 | 28 | 42 | A + M | 1671 | 1824 | 8 | 14 |
| Comparative example 2 | Invention slab 2 | 1.8 | 1.8 | 0 | — | — | A | 490 | 1250 | 55 | 62 |
| Comparative example 3 | Comparative slab 2 | 1.1 | 0.99 | 10 | 390 | 267 | A | 808 | 1218 | 41 | 53 |
| Comparative example 4 | Comparative slab 1 | 1.8 | 1.1 | 39 | 475 | 220 | A | 680 | 1190 | 11 | 11 |
| Comparative example 5 | Comparative slab 2 | 1.8 | 1.1 | 39 | 475 | 220 | A | 1078 | 1426 | 7 | 7 |
| Comparative example 6 | Comparative slab 3 | 1.8 | 1.1 | 39 | 475 | 220 | A | 1308 | 1325 | 3 | 13 |
| Comparative example 7 | Comparative slab 4 | — | — | — | — | — | F + M | 745 | 1017 | 8 | 17 |
| Comparative example 8 | Comparative slab 5 | — | — | — | — | — | F + M | 1231 | 1290 | 3 | 8 |
| Comparative example 9 | Comparative slab 6 | — | — | — | — | — | A | 635 | 1156 | 62 | 70 |
| Comparative example 10 | Comparative slab 7 | — | — | — | — | — | A | 503 | 784 | 45 | 59 |

A: Austenite
F: Ferrite
M: Martensite

Mechanical properties of the as hot rolled raw materials that were produced are also shown in Table 2. Every steel of the practical examples of the present invention had yield point of not less than 1000 MPa and total elongation of not less than 20%. In contrast, no steel of the comparative examples had both yield point of not less than 1000 MPa and total elongation of not less than 20%.

Figure 2:
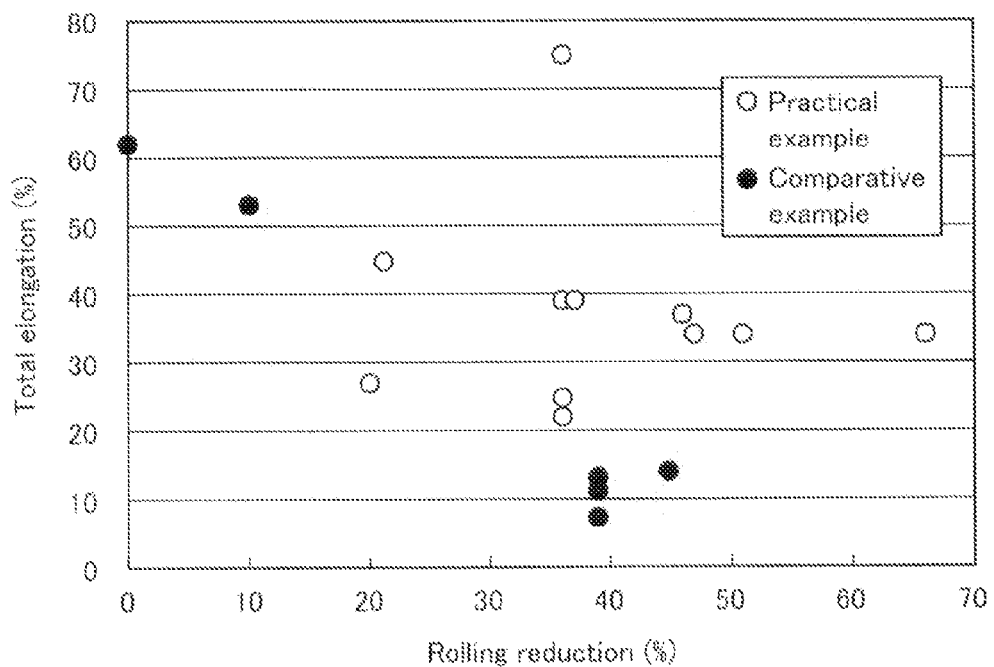
FIG. 2 is a graph showing a relationship of rolling reduction and total elongation that was measured in a tensile test.
Figure 3:
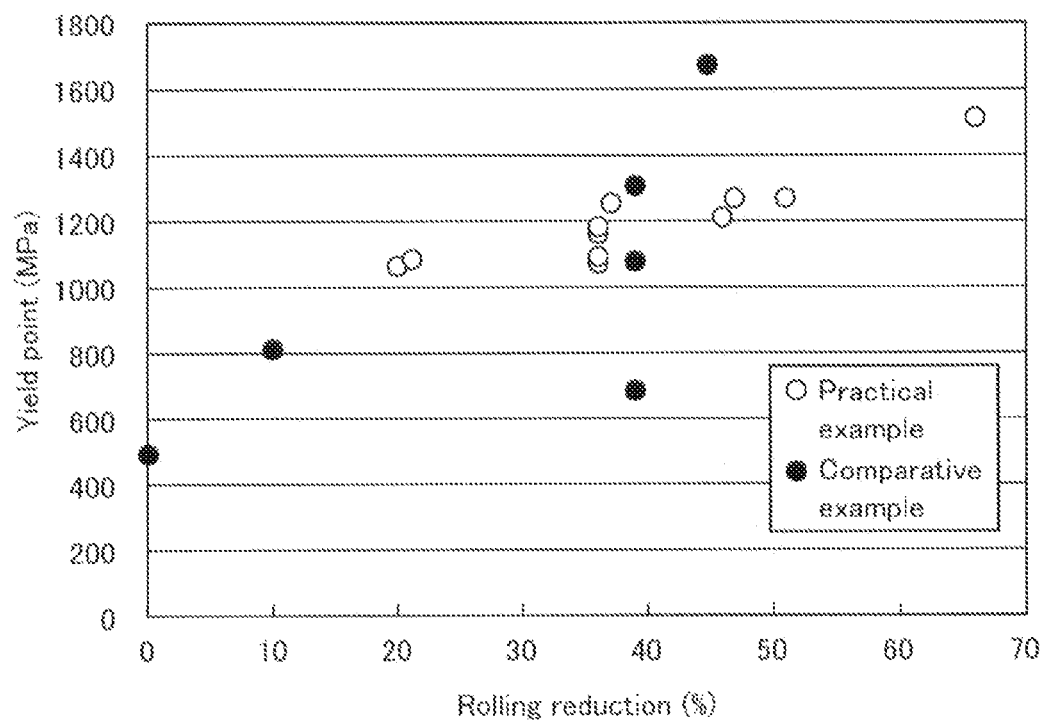
FIG. 3 is a graph showing a relationship of rolling reduction and yield point that was measured in a tensile test.
Figure 4:
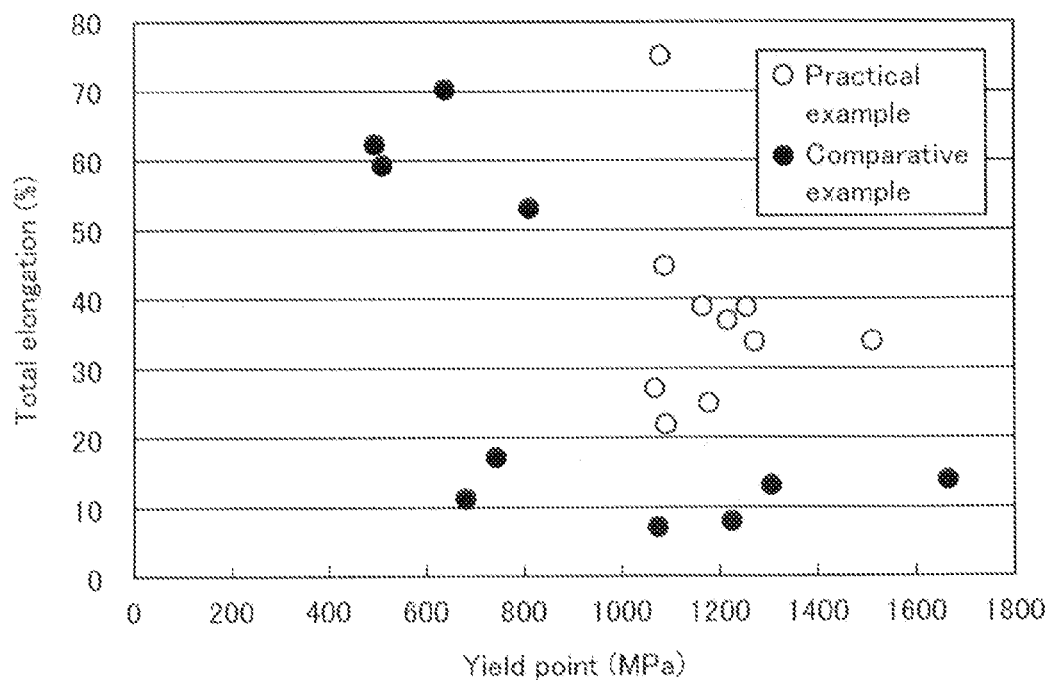
FIG. 4 is a graph showing a relationship of yield point and total elongation.

FIG. 2 is a graph showing a relationship of rolling reduction and total elongation that was measured in a tensile test. As shown in FIG. 2, when the rolling reduction is 20% or higher, the total elongation of not less than 20% can be provided to a steel. FIG. 3 shows a graph showing a relationship of rolling reduction and yield point that was measured in a tensile test. As shown in FIG. 3, when the rolling reduction is 20% or higher, the yield point of not less than 1000 MPa can be provided to a steel. FIG. 4 shows a relationship of the total elongation and the yield point, which was obtained by arranging the results in FIGS. 2 and 3. As shown in FIG. 4, the steel sheet of the present invention had both yield point of not less than 1000 MPa and total elongation of not less than 20%. According to the present invention, a high-strength steel sheet having a superior balance of strength and ductility can be produced.

Figure 5:
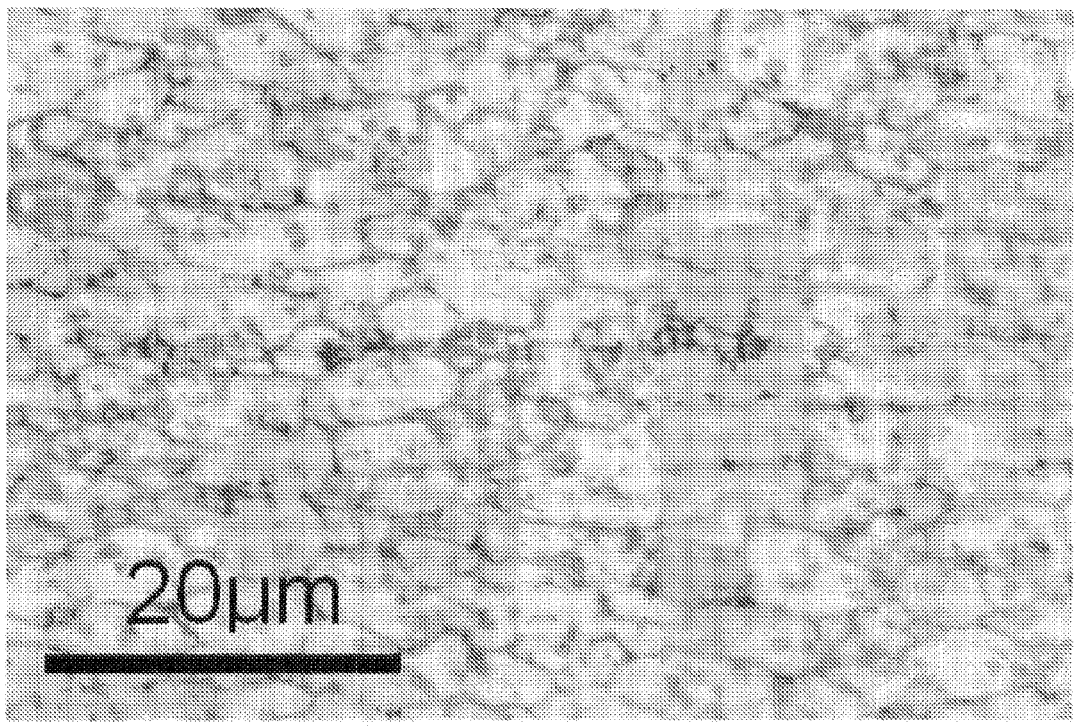
FIG. 5 is an optical micrograph of a longitudinal cross section, which was parallel to the rolling direction, of a steel sheet of the practical example of the present invention.

The coexisting phases of the steels of practical examples and comparative examples are shown in Table 3. In every steel of the practical examples of the present invention that has a yield point of not less than 1000 MPa and total elongation of not less than 20%, the aspect ratio of crystal grain sizes that was measured at a cross section parallel to the rolling direction was not less than 2. In addition, the increasing rate of total content of martensite with respect to tensile strain of 1% was not less than 0.6%. In contrast, in each steel of the comparative examples, one of the aspect ratio and the increasing rate of the total content of martensite, or both, did not reach the above degree. FIG. 5 is an optical micrograph of a cross section that was parallel to the rolling direction of the steel sheet of the practical example 9, and the steel included crystal grains in which the aspect ratio was 2.7.

TABLE 3

| | Compositions Symbols | Metal structure | Before deformation Content of martensite % | Aspect ratio | After deformation Content of martensite % | After deformation Rate of change in content of martensite with respect to strain of % |
|---|---|---|---|---|---|---|
| | Standard | | | not less than 2 | | not less than 0.6 |
| Practical example 1 | Invention slab 1 | A | 2.7 | 2.3 | 26 | 0.71 |
| Practical example 2 | Invention slab 2 | A | 0.6 | 3.5 | 24 | 0.87 |
| Practical example 3 | Invention slab 2 | A | 1 | 2.0 | 27 | 0.94 |
| Practical example 4 | Invention slab 2 | A | 0.7 | 4.5 | 21 | 0.71 |
| Practical example 5 | Invention slab 2 | A | 0.9 | 3.6 | 20 | 0.67 |
| Practical example 6 | Invention slab 2 | A | 0.8 | 4.6 | 18 | 0.66 |
| Practical example 7 | Invention slab 2 | A | 0.7 | 4.9 | 19 | 0.68 |
| Practical example 8 | Invention slab 2 | A | 1.6 | 6.5 | 26 | 0.87 |

TABLE 3-continued

|  | Compositions Symbols | Metal structure | Before deformation Content of martensite % | Aspect ratio | After deformation Content of martensite % | After deformation Rate of change in content of martensite with respect to strain of % |
|---|---|---|---|---|---|---|
| Practical example 9 | Invention slab 2 | A | 10 | 2.7 | 28 | 1.04 |
| Comparative example 1 | Invention slab 2 | A + M | 32 | 5.1 | 33 | 0.14 |
| Comparative example 2 | Invention slab 2 | A | 3 | 1.3 | 22 | 0.76 |
| Comparative example 3 | Invention slab 2 | A | 3 | 1.8 | 28 | 0.77 |
| Comparative example 7 | Comparative slab 4 | F + M | 25 | 1.2 | 25 | 0 |
| Comparative example 8 | Comparative slab 5 | F + M | 99 | — | 99 | 0 |
| Comparative example 9 | Comparative slab 6 | A | 1 | 1.2 | 1 | 0 |
| Comparative example 10 | Comparative slab 7 | A | 5 | 1.1 | 5 | 0 |

A: Austenite
F: Ferrite
M: Martensite

INDUSTRIAL APPLICABILITY

A high-strength steel sheet of the present invention has high strength and high press formability, in which the yield point is not less than 1000 MPa and total elongation is not less than 20%. Therefore, the high-strength steel sheet may be specifically used in fields such as structural parts of automobiles, which greatly affect the safety performance with respect to impacts.

The invention claimed is:

1. A high-strength steel sheet consisting of, by weight: not less than 0.25% and not more than 0.5% of C, not less than 4% and not more than 14% of Mn, not less than 6.5% and not more than 9.5% of Cr, and not less than 0.3% and not more than 3% of Si, not less than 0.005% and not more than 0.05% of N, not less than 0.05% and not more than 4% of Al, not less than 0.1% and not more than 4% of Ni, not less than 0.05% and not more than 3% of Mo, and not less than 0.1% and not more than 2% of Cu, balance of Fe and inevitable impurities;
the high-strength steel sheet satisfying the following formulas 1 and 2, in which the element symbol indicates the content thereof in weight %, the prefactors representing the chromium and nickel equivalents, and the steel consisting essentially of austenite; and
the high-strength steel sheet having a yield strength of not less than 1000 MPa and total elongation of not less than 20%

$$12 \leq 2.0Si + 5.5Al + Cr + 1.5Mo \leq 25 \quad (1)$$

$$13 \leq 30C + 0.5Mn + 0.3Cu + Ni + 25N \leq 17 \quad (2).$$

2. The high-strength steel sheet according to claim 1, wherein the steel sheet includes martensite at total content of not more than 10%, and aspect ratio of crystal grain sizes that is measured at a cross section parallel to the rolling direction is not less than 2.

3. The high-strength steel sheet according to claim 1, wherein the steel sheet has martensite, of which weight percentage increases at not less than 0.6% when the high-strength steel sheet is deformed by tensile strength at a tensile strain of 1%.

4. A method for producing a high-strength steel sheet as recited in claim 1, the method comprising:

hot rolling a slab consisting of a predetermined composition; and
rolling the slab so that total rolling reduction R in % and rolling temperature T in ° C. satisfy the following formulas (3) and (4)

$$20\% \leq R \leq 70\% \quad (3)$$

$$60°\,C. \leq T \leq 500°\,C. \quad (4).$$

5. The high-strength steel sheet according to claim 2, wherein the steel sheet has martensite, of which weight percentage increases at not less than 0.6% when the high-strength steel sheet is deformed by tensile strength at a tensile strain of 1%.

6. A method for producing a high-strength steel sheet as recited in claim 2, the method comprising:

hot rolling a slab consisting of a predetermined composition; and
rolling the slab so that total rolling reduction R in % and rolling temperature T in ° C. satisfy the following formulas (3) and (4)

$$20\% \leq R \leq 70\% \quad (3)$$

$$60°\,C. \leq T \leq 500°\,C. \quad (4).$$

7. A method for producing a high-strength steel sheet as recited in claim 3, the method comprising:

hot rolling a slab consisting of a predetermined composition; and
rolling the slab so that total rolling reduction R in % and rolling temperature T in ° C. satisfy the following formulas (3) and (4)

$$20\% \leq R \leq 70\% \quad (3)$$

$$60°\,C. \leq T \leq 500°\,C. \quad (4).$$

8. A method for producing a high-strength steel sheet as recited in claim 1, wherein the high-strength steel sheet contains not more than 8.4% by weight of Mn.

* * * * *